(12) United States Patent
Verheijen et al.

(10) Patent No.: US 9,815,368 B2
(45) Date of Patent: Nov. 14, 2017

(54) APPARATUS AND METHOD FOR DETERMINING AN ADVISED DRIVING SPEED

(71) Applicant: TomTom Telematics B.V., Amsterdam (NL)

(72) Inventors: Paul Roeland Verheijen, Heemstede (NL); Jasper Johannes Anthonius Pauwelussen, The Hague (NL); Marco Leupold, Leipzig (DE); Christoph Ebert, Leipzig (DE); Steffen Orlowsky, Dessau-Roβlau (DE); Markus Oesterreich, Leipzig (DE)

(73) Assignee: TomTom Telematics B.V., Amsterdam (NL)

( * ) Notice: Subject to any disclaimer, the term of this patent is extended or adjusted under 35 U.S.C. 154(b) by 0 days.

(21) Appl. No.: 14/952,964

(22) Filed: Nov. 26, 2015

(65) Prior Publication Data

US 2016/0144713 A1 May 26, 2016

(30) Foreign Application Priority Data

Nov. 26, 2014 (GB) .................................. 1420988.6
Mar. 12, 2015 (GB) .................................. 1504189.0

(51) Int. Cl.
*B60K 31/00* (2006.01)
*B60W 40/09* (2012.01)
(Continued)

(52) U.S. Cl.
CPC ....... *B60K 31/00* (2013.01); *B60W 30/18072* (2013.01); *B60W 30/18109* (2013.01);
(Continued)

(58) Field of Classification Search
CPC ..... B60W 30/18072; B60W 30/18109; B60W 30/18136; B60W 40/09; B60W 50/14; B60W 2030/18081; B60W 2030/1809; B60W 2050/0078; B60W 2510/0623; B60W 2510/0638; B60W 2510/0642;
(Continued)

(56) References Cited

U.S. PATENT DOCUMENTS

| 2011/0060521 A1* | 3/2011 | Watkins ............. G01C 21/3469 701/469 |
| 2013/0041621 A1 | 2/2013 | Smith et al. |

(Continued)

*Primary Examiner* — Michael D Lang (57) ABSTRACT

A method and apparatus for evaluating an advised driving speed of a vehicle traversing a particular portion of a road network is disclosed. The method comprises accessing first predetermined data indicative of the variation in average fuel consumption for the vehicle with speed of the vehicle, using the first predetermined data to determine data indicative of average fuel consumption for the vehicle for a plurality of speeds within a range based on a speed limit for the portion of the road network being traversed, and evaluating the advised driving speed of the vehicle based at least in part on the determined data indicative of average fuel consumption for the vehicle for the range of speeds. The evaluation of the advised driving speed may further be based on second predetermined data indicative of the variation in a likelihood of the vehicle being in the highest gear with speed of the vehicle.

16 Claims, 7 Drawing Sheets

(51) Int. Cl.
*G07C 5/00* (2006.01)
*G07C 5/08* (2006.01)
*F16H 59/44* (2006.01)
*F16H 59/46* (2006.01)
*F16H 61/02* (2006.01)
*B60W 50/14* (2012.01)
*B60W 30/18* (2012.01)
*G01C 21/36* (2006.01)
*G08G 1/01* (2006.01)
*G07C 5/02* (2006.01)
*G07C 5/06* (2006.01)
*G08G 1/0962* (2006.01)
*G08G 1/0967* (2006.01)
*G08G 1/0968* (2006.01)
*B60R 16/023* (2006.01)
*B60W 50/00* (2006.01)
*F16H 63/42* (2006.01)

(52) U.S. Cl.
CPC ...... *B60W 30/18136* (2013.01); *B60W 40/09* (2013.01); *B60W 50/14* (2013.01); *F16H 59/44* (2013.01); *F16H 59/46* (2013.01); *F16H 61/0213* (2013.01); *F16H 61/0246* (2013.01); *G01C 21/3697* (2013.01); *G07C 5/004* (2013.01); *G07C 5/008* (2013.01); *G07C 5/02* (2013.01); *G07C 5/06* (2013.01); *G07C 5/0816* (2013.01); *G07C 5/0841* (2013.01); *G08G 1/0112* (2013.01); *G08G 1/0129* (2013.01); *G08G 1/0141* (2013.01); *G08G 1/09626* (2013.01); *G08G 1/09685* (2013.01); *G08G 1/096716* (2013.01); *G08G 1/096741* (2013.01); *G08G 1/096775* (2013.01); *G08G 1/096827* (2013.01); *G08G 1/096861* (2013.01); *B60K 2350/1092* (2013.01); *B60R 16/0236* (2013.01); *B60W 2030/1809* (2013.01); *B60W 2030/18081* (2013.01); *B60W 2050/0078* (2013.01); *B60W 2510/0623* (2013.01); *B60W 2510/0638* (2013.01); *B60W 2510/0642* (2013.01); *B60W 2510/0647* (2013.01); *B60W 2510/1005* (2013.01); *B60W 2520/10* (2013.01); *B60W 2520/105* (2013.01); *B60W 2530/14* (2013.01); *B60W 2550/14* (2013.01); *B60W 2550/141* (2013.01); *B60W 2550/20* (2013.01); *B60W 2550/402* (2013.01); *B60W 2560/06* (2013.01); *B60W 2710/0655* (2013.01); *B60Y 2300/52* (2013.01); *F16H 2061/0218* (2013.01); *F16H 2063/426* (2013.01); *Y02T 10/76* (2013.01); *Y02T 10/84* (2013.01)

(58) Field of Classification Search
CPC . B60W 2510/0647; B60W 2510/1005; B60W 2520/10; B60W 2520/105; B60W 2530/14; B60W 2550/14; B60W 2550/141; B60W 2550/20; B60W 2550/402; B60W 2560/06; B60W 2710/0655; F16H 59/44; F16H 59/46; F16H 61/0213; F16H 61/0246; F16H 2061/0218; F16H 2063/426; G01C 21/3469; G01C 21/3492; G01C 21/3697; G07C 5/004; G07C 5/008; G07C 5/02; G07C 5/06; G07C 5/0816; G07C 5/0841; G08G 1/0129; B60K 2350/1092; B60R 16/0236; B60Y 2300/52
See application file for complete search history.

(56) References Cited

U.S. PATENT DOCUMENTS

2014/0032087 A1   1/2014  Shiri et al.
2014/0277835 A1*  9/2014  Filev .................. G01C 21/3469
                                                  701/2

* cited by examiner

Figure 1

A : current vehicle state data (OBD data and data derived therefrom)

B : fuel consumption, gear information

C : green speed

D : aggregated events for determining performance indictors

E : statistics based on determined performance indicators

F : report data with determined performance indicators

APPARATUS AND METHOD FOR DETERMINING AN ADVISED DRIVING SPEED

CROSS REFERENCE TO RELATED APPLICATIONS

This application claims the benefit of United Kingdom Patent Application No. 1420988.6 filed Nov. 26, 2015 and United Kingdom Patent Application No. 1504189.0 filed Mar. 12, 2015. The entire content of these application is incorporated herein by reference.

FIELD OF THE INVENTION

The present invention relates to a method and apparatus for determining an advised or recommended speed for a vehicle that, when used by the driver, can lead to improvements in fuel efficiency. In embodiments, the invention further relates to methods and apparatus for determining when to provide such an advised driving speed to a driver. In other embodiments, the invention further relates to methods and apparatus for evaluating vehicle driving, for example, for provision to a driver of the vehicle and/or to a manager of a fleet of vehicles.

BACKGROUND OF THE INVENTION

Increasingly it is desired to improve a fuel economy of vehicles, particularly, although not exclusively, vehicles powered by fossil fuels, such as petrol and diesel. Although it will be realised that improving the fuel economy of any vehicle, including electric, hybrid and hydrogen powered vehicles, for example, is also desired. Some efforts at improving the fuel economy of vehicles are focussed on increasing an efficiency of the vehicle, such as a mechanical and/or electrical efficiency of the vehicle. It has also been realised that the manner in which a vehicle is driven can have a significant impact of the vehicle's economy.

People often drive at speeds that are inefficient in terms of fuel consumption. This is often because they do not know an appropriate, efficient speed at which to drive. In addition, there is a significant variation in fuel efficiency from vehicle to vehicle, vehicle type to vehicle type, and from driver to driver based on their driving style. Driving in a way which is more fuel efficient can reduce the harmful pollutants emitted from a vehicle, and reduce the cost of the fuel used during a journey. Furthermore, a fuel-efficient driving styles can reduce the stress on the components of the vehicle, for example the engine, resulting in increased durability for these vehicle components.

Therefore it is desired to provide a method to determine a recommended speed for a vehicle that optimises fuel efficiency. It is also desirable to provide a method by which vehicle driving can be evaluated with respect to such a determined recommended speed.

SUMMARY OF THE INVENTION

In accordance with a first aspect of the present invention there is provided a method of providing an advised driving speed to a driver of a vehicle travelling on a road network, comprising:
 determining an advised driving speed of a vehicle for a portion of the road network currently being traversed;
 determining a current speed of the vehicle on the portion of the road network;
 determining a speed limit and/or an expected driving speed for the portion of the road network; and
 providing an indication of the advised driving speed to the driver of the vehicle when: (i) the current speed of the vehicle is greater than a first threshold value based on the advised driving speed; and (ii) the speed limit and/or the expected driving speed is greater than a second threshold value.

The present invention extends to an apparatus for carrying out a method in accordance with any of the aspects or embodiments of the invention herein described.

Thus, in accordance with another aspect of the invention there is provided an apparatus for providing an advised driving speed to a driver of a vehicle travelling on a road network, comprising:
 means for determining an advised driving speed of a vehicle for a portion of the road network currently being traversed;
 means for determining a current speed of the vehicle on the portion of the road network;
 means for determining a speed limit and/or an expected driving speed for the portion of the road network; and
 means for providing an indication of the advised driving speed to the driver of the vehicle when: (i) the current speed of the vehicle is greater than a first threshold value based on the advised driving speed; and (ii) the speed limit and/or the expected driving speed is greater than a second threshold value.

Similarly, in accordance with another aspect of the invention there is provided an apparatus for providing an advised driving speed to a driver of a vehicle travelling on a road network, comprising at least one processor and a memory containing instructions that, when executed by the at least one processor, cause the apparatus to:
 determine an advised driving speed of a vehicle for a portion of the road network currently being traversed;
 determine a current speed of the vehicle on the portion of the road network;
 means for determining a speed limit and/or an expected driving speed for the portion of the road network; and
 provide an indication of the advised driving speed to the driver of the vehicle when: (i) the current speed of the vehicle is greater than a first threshold value based on the advised driving speed; and (ii) the speed limit and/or the expected driving speed is greater than a second threshold value.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

In embodiments, the method may comprise continually determining the advised driving speed, the current speed of the vehicle and the speed limit and/or expected driving speed as the vehicle travels along the road network, and stopping the provision of the advised driving speed when at least one of: (i) the current speed of the vehicle is less than the first threshold value; and (ii) the speed limit and/or the expected driving speed is less than the second threshold value. The step of providing an indication of the advised driving speed to the driver may comprise displaying a graphical indication of the advised driving speed on a display device within the vehicle. The determined advised driving speed may be displayed on the display device in combination with at least one of: the current speed of the vehicle; and the speed limit for the portion of the road network being traversed.

In embodiments, the method may comprise triggering a determination of the advised driving speed when there is change in the speed limit and/or expected driving speed for the portion of the road network being traversed. The determination of the advised driving speed may be triggered when the change in the speed limit and/or expected driving speed is more than a predetermined threshold.

In embodiments, the first threshold value may be based on the advised driving speed comprises a predetermined percentage of the advised driving speed. The predetermined percentage may comprise a value between 70 to 90%, optionally 80%.

In embodiments, the second threshold value may comprise a value between 80 and 100 km/h, more preferably 90 km/h.

In embodiments, the determination of the advised driving speed may comprise subtracting a predetermined value from determined speed limit. The predetermined value may comprise a value between 5 and 15 km/h, more preferably 10 km/h.

In other embodiments, the determination of the advised driving speed may comprise accessing first predetermined data indicative of the variation in average fuel consumption for the vehicle with speed of the vehicle, using the first predetermined data to determine data indicative of average fuel consumption for the vehicle for a plurality of speeds within a range based on a speed limit for the portion of the road network being traversed, and evaluating the advised driving speed based at least in part on the determined data indicative of average fuel consumption for the vehicle for the range of speeds. The vehicle may be a geared vehicle, and the determination of the advised driving speed may further comprise accessing second predetermined data indicative of the variation in a likelihood of the vehicle being in the highest gear with speed of the vehicle, and using the second predetermined data to determine data indicative of a likelihood of the vehicle being in the highest gear for the plurality of speeds within the range based on a speed limit for the portion of the road network being traversed, wherein said evaluating the advised driving speed of the vehicle is further based on the determined data indicative of a likelihood of the vehicle being in the highest gear for the range of speeds. The determination of the advised driving speed may further comprise determining a score value for each of the plurality of speeds within the range based on a speed limit for the portion of the road network being traversed, said score value being determined using the first predetermined data and the second predetermined data, and setting the advised driving speed of the vehicle as a speed from the plurality of speeds within the range based on the determined score values.

It is believed that the determination of the advised driving speed in this manner may be new and advantageous in its own right. Thus, in accordance with a further aspect of the invention there is provided a method of evaluating an advised driving speed of a vehicle traversing a particular portion of a road network, comprising:

accessing first predetermined data indicative of the variation in average fuel consumption for the vehicle with speed of the vehicle;

using the first predetermined data to determine data indicative of average fuel consumption for the vehicle for a plurality of speeds within a range based on a speed limit for the portion of the road network being traversed; and evaluating the advised driving speed of the vehicle based at least in part on the determined data indicative of average fuel consumption for the vehicle for the range of speeds.

The present invention extends to an apparatus for carrying out a method in accordance with any of the aspects or embodiments of the invention herein described.

Thus, in accordance with another aspect of the invention there is provided an apparatus for evaluating an advised driving speed of a vehicle traversing a particular portion of a road network, comprising:

means for accessing first predetermined data indicative of the variation in average fuel consumption for the vehicle with speed of the vehicle;

means for using the first predetermined data to determine data indicative of average fuel consumption for the vehicle for a plurality of speeds within a range based on a speed limit for the portion of the road network being traversed; and means for evaluating the advised driving speed of the vehicle based at least in part on the determined data indicative of average fuel consumption for the vehicle for the range of speeds.

Similarly, in accordance with another aspect of the invention there is provided an apparatus for evaluating an advised driving speed of a vehicle traversing a particular portion of a road network, comprising at least one processor and a memory containing instructions that, when executed by the at least one processor, cause the apparatus to:

access first predetermined data indicative of the variation in average fuel consumption for the vehicle with speed of the vehicle;

use the first predetermined data to determine data indicative of average fuel consumption for the vehicle for a plurality of speeds within a range based on a speed limit for the portion of the road network being traversed; and evaluate the advised driving speed of the vehicle based at least in part on the determined data indicative of average fuel consumption for the vehicle for the range of speeds.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

For example, in embodiments, the first predetermined data may be indicative of the variation in average fuel consumption for the vehicle with speed of the vehicle is a fuel consumption per speed histogram. The method may further comprise generating the fuel consumption per speed histogram for the vehicle, said generating comprising receiving a plurality of fuel consumption values of the vehicle, receiving a corresponding plurality of speeds of the vehicle, wherein each speed of the vehicle indicates the speed for which a corresponding fuel consumption value was determined, assigning each of the fuel consumption values to one of a plurality of bins of a histogram based on the corresponding speed of the vehicle at which the fuel consumption value was determined, and evaluating an average fuel consumption value for each bin of the histogram by averaging the fuel consumption values within each bin.

Moreover, in embodiments, wherein the vehicle is a geared vehicle, the method may further comprise accessing second predetermined data indicative of the variation in a likelihood of the vehicle being in the highest gear with speed of the vehicle, and using the second predetermined data to determine data indicative of a likelihood of the vehicle being in the highest gear for the plurality of speeds within the range based on a speed limit for the portion of the road network being traversed, and wherein said evaluating the advised driving speed of the vehicle is further based on the determined data indicative of a likelihood of the vehicle being in the highest gear for the range of speeds. The second predetermined data may be indicative of the variation in a likelihood of the vehicle being in the highest gear with speed of the vehicle is a likelihood of the vehicle being in the highest gear per speed histogram. The method may further comprise generating the likelihood of the vehicle being in the highest gear per speed histogram for the vehicle, said generating comprising receiving, for each of a plurality of speeds of the vehicle, a value indicative of whether the vehicle was its highest gear at that speed, assigning each of the values indicative of whether the vehicle was its highest gear to one of a plurality of bins of a histogram based on the corresponding speed of the vehicle at which the value was determined, and evaluating an average value for each bin of the histogram by averaging the values indicative of whether the vehicle was its highest gear within each bin. The method may further comprise determining a score value for each of the plurality of speeds within the range based on a speed limit for the portion of the road network being traversed, said score value being determined using the first predetermined data and the second predetermined data, setting the advised driving speed of the vehicle as a speed from the plurality of speeds within the range based on the determined score values.

In embodiments, according to any of the aspects mentioned above, the road network is represented by an electronic map comprising a plurality of segments, each segment representing a portion of the road network, and each segment having associated therewith a speed limit and/or an expected driving speed for the portion of the road network represented by that segment, and wherein the determination of the speed limit and/or the expected driving speed for the portion of the road network may comprise retrieving the respective stored speed limit and/or expected driving speed associated with the segment of the electronic map that represents the portion of the road network currently being traversed.

In embodiments, the apparatus may further comprise a display device, and wherein the instructions, when executed by the at least one processor, cause the apparatus to display a graphical indication of the advised driving speed on the display device. The apparatus may comprise a portable navigation device or a navigation device integrated in the vehicle.

In accordance with another aspect of the present invention there is provided a method of determining a score indicative of the compliance of a driver of a vehicle to an advised driving speed during a journey on a road network, comprising:

determining a first time indicative of the total driving time of the vehicle during the journey when an advised driving speed was provided to the driver of the vehicle, wherein an advised driving speed is provided to the driver of the vehicle when: (i) a current speed of the vehicle is greater than a first threshold value based on a determined advised driving speed; and (ii) a speed limit and/or an expected driving speed for the portion of the road network being traversed is greater than a second threshold value;

determining a second time indicative of the driving time during the journey when the speed of the vehicle was less than a threshold based on the advised driving speed provided to the driver; and determining the score indicative of the compliance of the driver to the advised driving speed based on the first and second times.

The present invention extends to an apparatus for carrying out a method in accordance with any of the aspects or embodiments of the invention herein described.

Thus, in accordance with another aspect of the invention there is provided an apparatus for determining a score indicative of the compliance of a driver of a vehicle to an advised driving speed during a journey on a road network, comprising:

means for determining a first time indicative of the total driving time of the vehicle during the journey when an advised driving speed was provided to the driver of the vehicle, wherein an advised driving speed is provided to the driver of the vehicle when: (i) a current speed of the vehicle is greater than a first threshold value based on a determined advised driving speed; and (ii) a speed limit and/or an expected driving speed for the portion of the road network being traversed is greater than a second threshold value;

means for determining a second time indicative of the driving time during the journey when the speed of the vehicle was less than a threshold based on the advised driving speed provided to the driver; and means determining the score indicative of the compliance of the driver to the advised driving speed based on the first and second times.

Similarly, in accordance with another aspect of the invention there is provided an apparatus for determining a score indicative of the compliance of a driver of a vehicle to an advised driving speed during a journey on a road network, comprising at least one processor and a memory containing instructions that, when executed by the at least one processor, cause the apparatus to:

determine a first time indicative of the total driving time of the vehicle during the journey when an advised driving speed was provided to the driver of the vehicle, wherein an advised driving speed is provided to the driver of the vehicle when: (i) a current speed of the vehicle is greater than a first threshold value based on a determined advised driving speed; and (ii) a speed limit and/or an expected driving speed for the portion of the road network being traversed is greater than a second threshold value;

determine a second time indicative of the driving time during the journey when the speed of the vehicle was less than a threshold based on the advised driving speed provided to the driver; and determine the score indicative of the compliance of the driver to the advised driving speed based on the first and second times.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

In embodiments, the determination of the score is based on a ratio of the second time to the first time. The determination of the second time may comprise determining the driving time during the journey when the speed of the vehicle was less than or equal to the advised driving speed provided to the driver.

In embodiments, the step of determining the first and/or second time comprises receiving the location of the vehicle at a plurality of times during the journey, determining an advised driving speed for the vehicle at each of the received locations, and determining a speed limit and/or an expected driving speed for the portion of the road network for each of the received locations. In other words, the vehicle can send their positions, typically a time-stamped position, to a server, and the server can use this received information to determine the speed of the vehicle at the location and the advised driving speed at the location, e.g. by determining the advised driving speed for a location based on the speed limit and/or expected speed limit for the location (which will typically be found in an electronic map, the received location being matched to a corresponding location in the electronic map). The server is also able to determine whether the advised driving speed was provided to the driver in the vehicle, and thus it is possible for the server to determine the score of the compliance of the driver to the advised driving speed based only on the received (time-stamped) location data. It will be appreciated, however, that in some embodiments, the vehicle location and associated speed of the vehicle may be received, rather than needing to determine the speed of the vehicle from the time-stamped locations.

In other embodiments, the step of determining the first and/or second time comprises receiving the location of the vehicle and the associated advised driving speed for each location at a plurality of times during the journey, and determining a speed limit and/or an expected driving speed for the portion of the road network for each of the received locations. In other words, in this embodiments, the vehicle would also transmit the advised driving speed determined within the vehicle to the server, e.g. since the advised driving speed is determining using at least a fuel consumption against speed histogram.

Thus, in embodiments, the apparatus may comprise a server arranged to receive the location of the vehicle at a plurality of times during the journey, and optionally to receive at least one the speed of the vehicle and the advised driving speed for each location.

In embodiments the method may further comprise transmitting the determined score for display on a remote device. The remote device may a device within the vehicle, e.g. the same device on which the advised driving speed is provided or displayed. Additionally, or alternatively, the remote device may be a computer of a manger of a feet of vehicles, including the vehicle and driver for which the score relates, and the score can be displayed to the fleet manager, possibly with scores from other previously journeys made by the vehicle and/or driver.

Methods in accordance with the present invention may be implemented at least partially using software, e.g. computer programs. The present invention thus also extends to a computer program comprising computer readable instructions executable to perform a method according to any of the embodiments of the invention.

The invention thus also extends to a computer software carrier comprising software which when used to operate a system or apparatus comprising data processing means causes, in conjunction with said data processing means, said apparatus or system to carry out the steps of a method in accordance with embodiments of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which.

DETAILED DESCRIPTION OF THE PREFERRED EMBODIMENTS

Embodiments of the invention are directed to methods and systems for monitoring the performance of drivers of vehicles over one or more journeys, and methods and systems for providing feedback to a driver in order to promote more economical driving.

Figure 1:
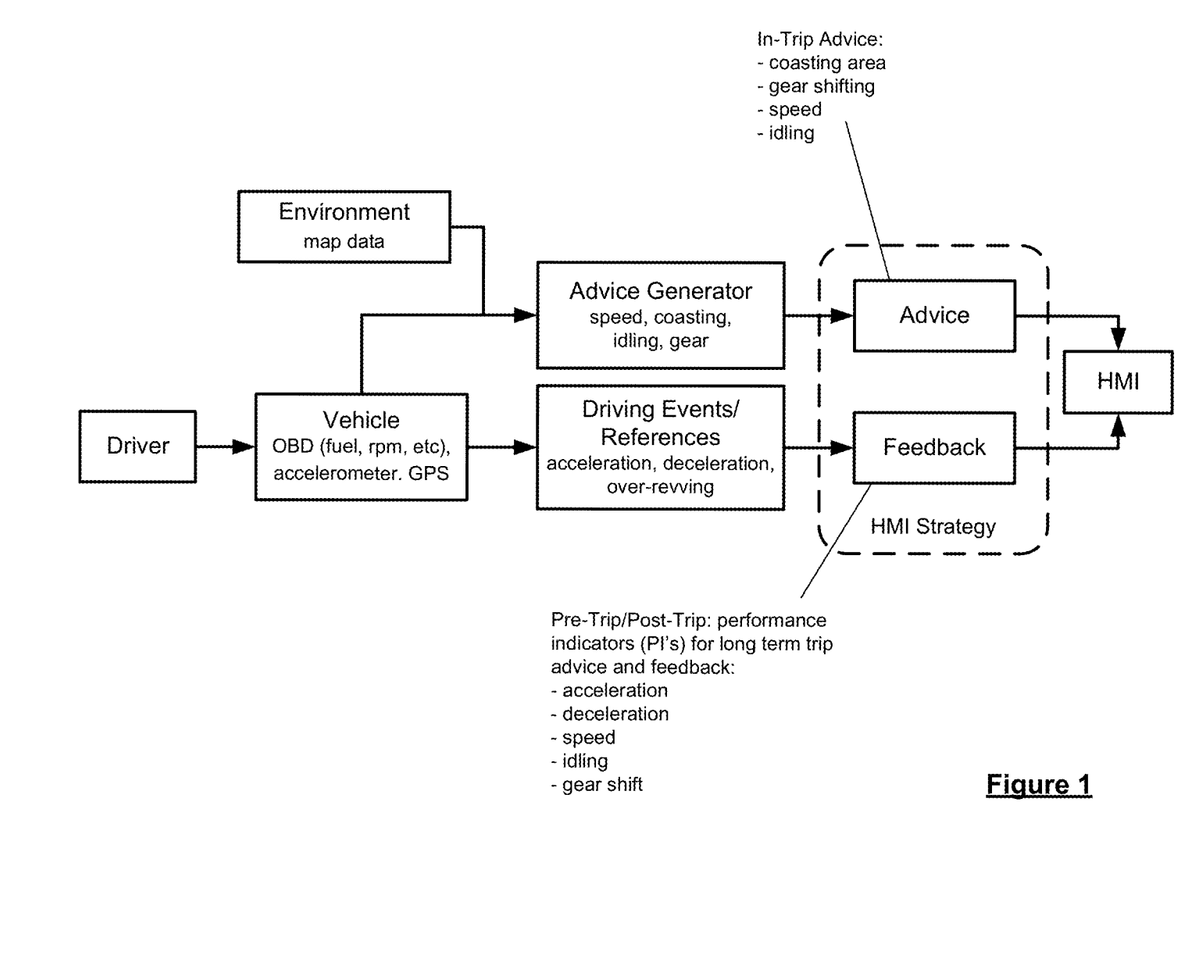
FIG. 1 is an illustration of a system for providing driver feedback.

An system for proving driver feedback is shown in FIG. 1. As shown in FIG. 1, the driver feedback comprises two components: feedback on current or historic driving performance (to be studied by the driver before beginning a trip or after having completed a trip); and advice on how driving styles can be modified to achieve more economical driving (which is typically given during a trip). The advice may comprise advice on an optimal or "green" speed to achieve maximum economical results; times/areas when "coasting" is possible; gear choice and when to change gear; etc. The feedback may comprise counts of events with harsh acceleration or declaration, speeding events (with respect to the speed limit and/or green speed), inefficient gear changes (over-revving), etc. The feedback may also comprise indicators as to how current and/or historic driving performance equates to predetermined goals, which may be set by the driver or may be set remotely by a fleet manager.

The invention is directed to the generation of a new performance indicator for use in providing driver feedback, and to methods for determining data for use in the generation of such a performance indicator. A summary of the each of the aspects of the invention is given below:

- The determination of an advised driving speed, such as an optimal speed of travel (or "green" speed) for the vehicle, to be provided to a driver of the vehicle, e.g. based on a legal speed limit and/or an expected driving speed for the road currently being traversed, or based on a generated fuel consumption against speed histogram, and optionally information about the current gear and highest (or maximum gear) of a vehicle
- The determination of when to determine and/or provide, e.g. display, such a determined advised driving speed to the driver of the vehicle during a trip
- The determination of a green speed metric (or performance indicator) based on the amount of time driven during a trip at the proposed green speed in relation to the total driving time of the trip System Architecture The vehicle may be of any type of vehicle including a conventional (fossil fuel) powered vehicle, e.g. petrol or diesel, a hybrid vehicle, a hydrogen powered vehicle, a fuel cell powered vehicle or an electric vehicle. Embodiments of the invention will be described with reference to a vehicle having an engine (or drive unit) operative at an engine speed and fuel being supplied to the engine (or being consumed by the engine) at a fuel rate. It will, however, be realised that these terms may be construed accordingly to encompass the aforementioned types of vehicles.

Figure 2:
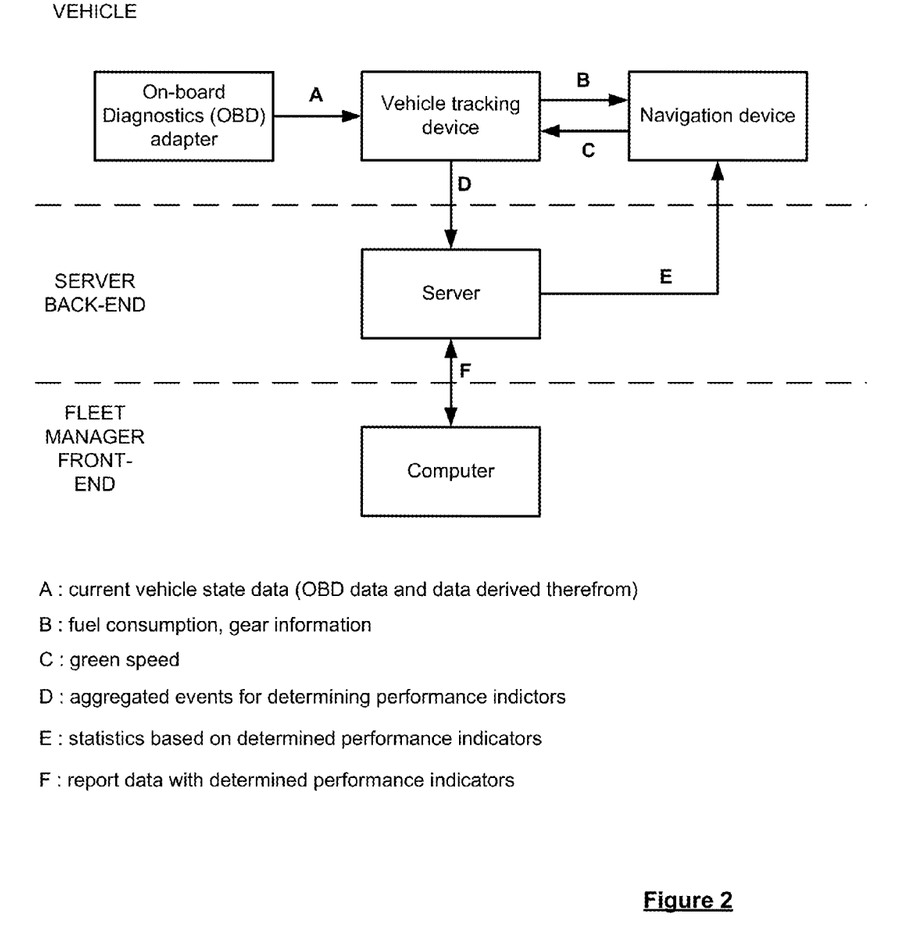
FIG. 2 is an illustration of a system according to an embodiment of the present invention.

The system of the invention is exemplified by FIG. 2 in which the vehicle can include: an on-board diagnostics (OBD) adapter; a vehicle tracking device; and a navigation device. The vehicle tracking device can be arranged to communicate with a server, which in turn is arranged to communicate with the navigation device in the vehicle and a computer, such as in the base of operations of the fleet manager. While the system the system shows three distinct devices in the vehicle: the OBD adapter; the vehicle tracking device and the navigation device, it will be appreciated that the vehicular components of the system can be shared between a greater number or a fewer number of devices as desired. Similarly, while FIG. 2 shows data being transmitted to the server only from the vehicle tracking device, in other embodiments data can be sent to the server from any of the vehicular devices as desired. The functionality of each of the components shown in FIG. 2 will now be described in more detail.

OBD Adapter:

The adapter device comprises an interface unit for communicating with one or more systems of the vehicle. The interface unit may be removably coupleable to an OBD port of the vehicle to receive data indicative of one or more parameters associated with the vehicle. The OBD port provides the one or more parameters to the interface unit from a communication bus of the vehicle. It will be realised, however, that the interface unit may communicate with the vehicle via other connections such as a via a wireless connection. The adapter device is therefore preferably configured to collect data from the OBD port in the vehicle, such as engine speed (rpm), vehicle speed, and to determine other information derived from such OBD data, such as the current gear, maximum gear, fuel consumption, etc, and to deliver the data to the vehicle tracking device. In other words, the data transmitted, in a wired and/or wireless manner, to the vehicle tracking device is indicative of a current state of the vehicle. It will be appreciated, however, that the speed of the vehicle may be determined in other ways, such as via received wireless location determining signals.

Vehicle Tracking Device:

The tracking device comprises a position determining device, such as a global navigation satellite system (GNSS) receiver, e.g. GPS or GLONASS. It will be appreciated, however, that other means may be used, such as using the mobile telecommunications network, surface beacons or the like. The positioning determining device generates tracking data, such as time-stamped positions, indicative of the change in position of the device over time. The tracking device further comprises one or more communication devices that are arranged to communicate with the OBD adapter, the navigation device and the server, either using a wired or wireless connection. The one or more communication devices can comprise a short range wireless transceiver, such as a Bluetooth transceiver, e.g. for communicating with the OBD adapter and the navigation device, and can comprise a mobile telecommunications transceiver, such as a GPRS or GSM transceiver, e.g. for communicating with the server. The tracking device further comprises at least one processor arranged to aggregate certain data for use in the subsequent generation of certain performance indicators (as discussed in more detail below), e.g. how closely a driver maintained a recommended fuel efficient optimal (or "green") speed. For example, the tracking device can enrich the tracking data with a calculated green speed, which can be used at the server to determine a green speed performance indicator (as discussed in more detail below).

Navigation Device:

The navigation device comprises at least one processor and a display device. The navigation device may be capable of one or more of: calculating a route to be travelled to a desired destination; and providing navigation instructions to guide the driver along a calculated route to reach a desired destination. The at least one processor is arranged to cause performance indicators (e.g. obtained from the server) to be displayed on the display device, e.g. before, during and/or after a trip. The at least one processor can be further arranged to display indicators on the display device, such as an indicator to change up in gear, e.g. if it is determined that the vehicle is not currently in the maximum gear. The at least one processor can be further arranged to detect and calculate a green speed, and to cause the calculated information to be displayed on the display device.

Server:

The server comprises at least one processor and a communications device for communicating with one of more of the vehicular devices, preferably the vehicle tracking device. The at least one processor can be further arranged to calculate a green speed, rather than receive a green speed from one of the devices in the vehicle. The at least one processor is arranged to calculate at least one performance indicator, e.g. the green speed indicator, for a trip.

Computer:

The computer is in communication with the server, and is used by a fleet manager to review the performance of the drivers of their fleet of vehicles based on the determined performance indicators.

Gear Detection

According to embodiments of the invention, there is provided methods and systems of determining gears of geared vehicle using vehicle speed and engine speed ratios of the vehicle, e.g. obtained over the OBD port of the vehicle using the OBD adapter device. The engine speed is typically represented using the unit rpm (revolutions per minute), which is a measure of the frequency of rotation of the engine. In standard gearboxes the rpm-speed ratios are expected to be constant for each gear, and thus having a list of all ratios would allow a currently engaged gear to be determined using a currently determined rpm-speed ratio.

Figure 3:
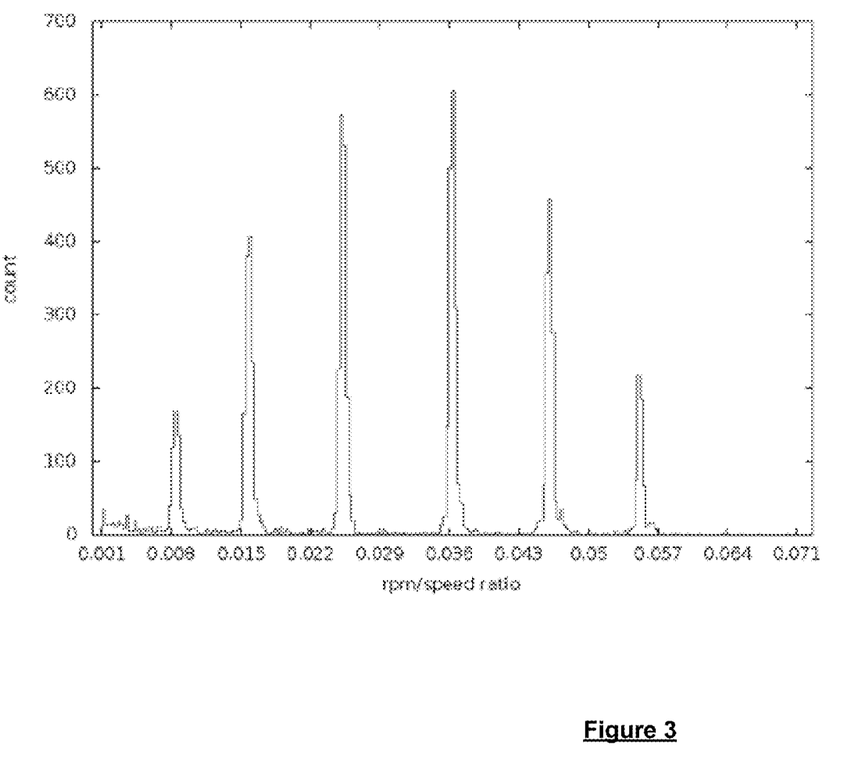
FIG. 3 is an illustration of a histogram that is generated according to an embodiment of the first aspect of the present invention.

A first embodiment uses a histogram based approach. In this embodiment, each of a plurality of speed-rpm ratios is assigned to an appropriate speed-rpm ratio bin (from among a plurality of speed-rpm ratio bins) to generate a histogram. A thresholding process can be applied to the histogram to identify a plurality of peaks, each peak being a speed-rpm ratio that relates to an engaged gear of the vehicle. These identified peaks can then be added to a gear table that has a plurality of entries, each entry being associated with an available gear of the vehicle and the speed-rpm ratio determined from the peak. An example of a histogram that is generated according to this embodiment is shown in FIG. 3. An advantage of this embodiment is that a currently engaged gear can be determined from a single sampled rpm-speed value. However, for example, some gears of the vehicle, e.g. reverse gear or first gear, may be rarely used and can be hard to identify. The method can also be difficult to implement if used in an OBD adapter (or other embedded device) which often has limited computer memory and processing resources, since the histogram table can be relatively large (depending on its level of granularity).

A second embodiment uses a continuous adaptation approach. In this embodiment, a plurality of successive speed-rpm ratios are obtained, and a determination made of a consistency measure indicative of a variation in the plurality of ratios. If consistency measure is within a predetermined limit, i.e. the successive ratios are effectively constant, then the observed 'constant' ratio can be said to be a result of a gear being engaged. A ratio found this way can be added as a new entry to a pre-existing gear table, or if similar to an existing entry used to fine-tune the speed-rpm ratio associated with the appropriate gear. Advantages of this embodiment are that the method is less impacted by noise often found in the data obtained from the OBD port, since the method is analysing relatively small sets of successive samples. Furthermore, the method requires less computational memory and processing resources in comparison to the first embodiment, and thus can be implemented more easily in an OBD adapter (or other embedded device).

Figure 4:
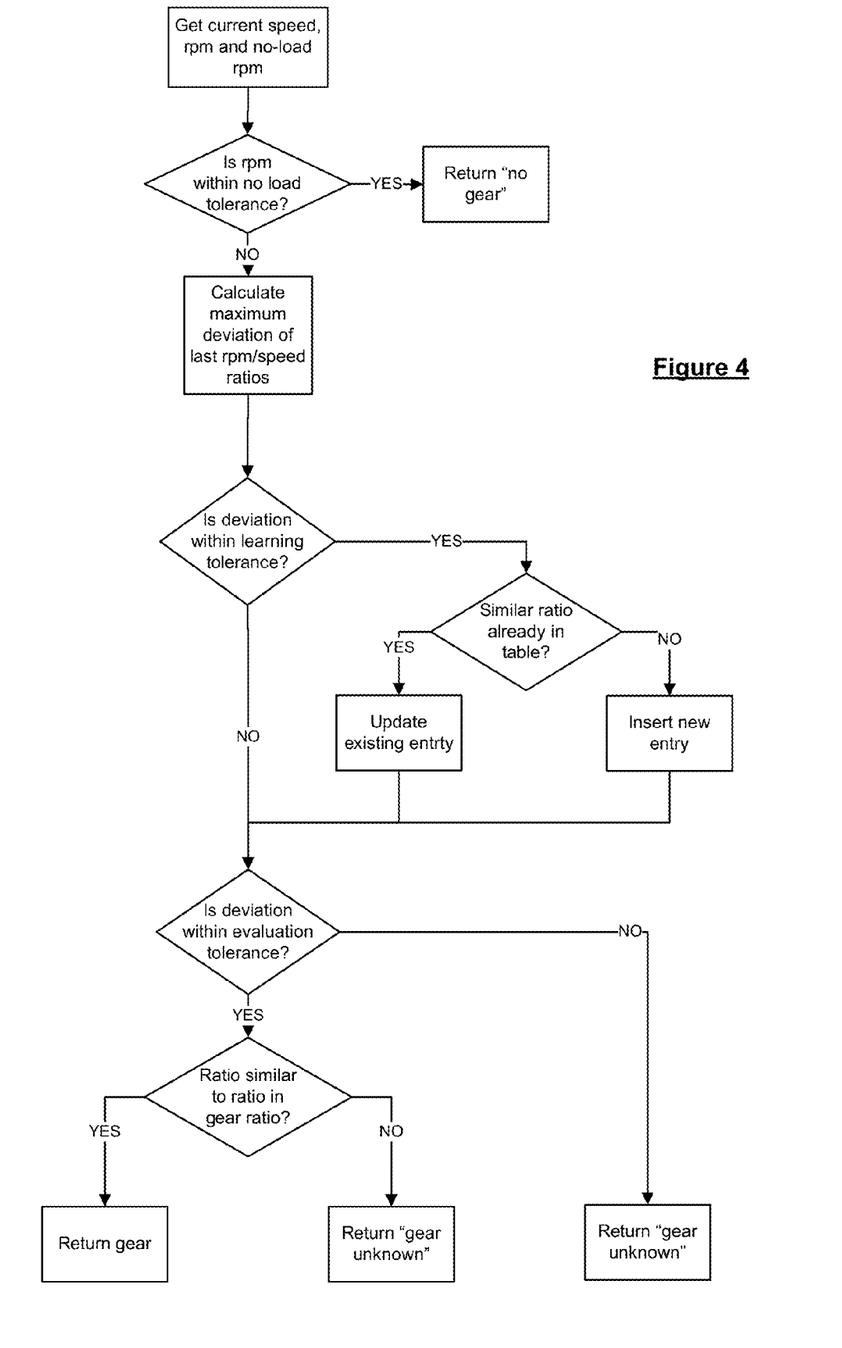
FIG. 4 is a flowchart showing an exemplary implementation of a gear detection algorithm according to an embodiment of the second aspect of the present invention.

An exemplary detailed implementation a gear detection algorithm according to the second embodiment is shown in FIG. 4. In this implementation the gear table is updated whenever the rpm-speed ratio is constant within a certain tolerance for a certain amount of samples. The current gear is returned whenever the rpm-speed ratio is constant with a certain (e.g. less strict) tolerance for a certain amount of samples. In this embodiment, gear ratios need to be detected multiple times to be considered stable. Unstable gear ratios are not taken into account when returning the current gear. A cyclic clean-up is used to remove unstable gear ratios.

Other improvements to the method of the second embodiment to ensure the gear table is accurate can include the use of:
- acceleration data from one or more accelerometers, since acceleration in a forward direction makes it more likely that a gear is engaged;
- other data from the OBD port, such as engine load, pedal position, etc
- speed data, since an increase in speed is again indicative that a gear is engaged.

Figure 5:
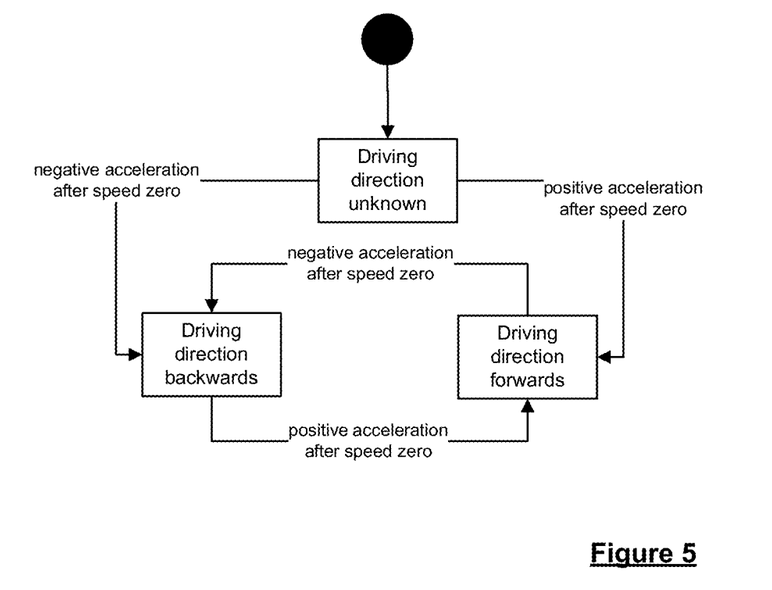
FIG. 5 is a flowchart showing an exemplary implementation of a reverse gear detection algorithm according to an embodiment of the present invention.

As will be appreciated, the method of the second embodiment exemplified in FIG. 4 does not allow for the accurate detection of the reverse gear. This is because the reverse gear is typically only engaged for a short period of time. Although it can, in some instances, be mistakenly identified as an additional gear between gear 1 and gear 2, which can cause inaccuracies when detecting the current gear. A method of accurately detecting the reverse gear can use acceleration data and speed data, e.g. as shown in FIG. 5. In this embodiment, a driving direction of the vehicle can be determined by identifying whether there is positive or negative acceleration after a period of zero speed; a positive acceleration indicating a forwards driving direction, and a negative acceleration indicating a backwards driving direction.

Thus, the invention encompasses a method of determining a current gear of a geared vehicle. The method can comprise receiving a speed-rpm ratio of the vehicle based on a speed of the vehicle and a corresponding rpm of a drive unit of the vehicle, e.g. using an OBD adapter connected to the OBD port of the vehicle. A difference is preferably calculated between the speed-rpm ratio and an available speed-rpm ratio corresponding to a predetermined available gear of the vehicle. A determination is preferably made that the speed-rpm ratio corresponds to an available gear if the difference is within a predetermined tolerance limit; this available gear then being assigned as the current gear. The predetermined available gears are taken from a gear table created in accordance with one of the first and second methods described above.

Green Speed

According to embodiments of the invention, there is provided methods and systems for determining a "green" speed for a vehicle. A green speed is a vehicle specific speed recommendation for a particular portion of the navigable, e.g. road, network. In particular, a green speed is a recommended speed for a vehicle to travel on a particular portion of the road network with the aim of optimising fuel consumption of the vehicle.

In embodiments, the determined green speed for a moment in time is added to the tracking data obtained by the vehicle tracking device and sent to the server, such that each time-stamped position is associated with a determined green speed. In other embodiments, the green speed can be determined separately on a device within the vehicle, such as the navigation device, and on the server; for example, when the green speed is determined based only on digital map data (as is discussed in more detail below).

Green Speed Calculation

In embodiments, the green speed is determined based on the (legal) speed limit for the road currently being traversed. This predetermined speed limit is preferably found in the digital map, wherein a plurality of segments, and typically each segment, of the digital map are associated with a legal speed limit. For example, in embodiments, the green speed is determined to be the speed limit minus a predetermined value, such as a value between 5-15 km/h, preferably 10 km/h. In other embodiments, the green speed is determined to be the speed limit multiplied by a scaling factor, which is preferably less than 1, and can be a factor between 0.85-0.95. In other words, the green speed can be percentage of the legal speed limit for the road currently being traversed.

In some sections of the road network, the legal speed limit is not always known, or there may not be a legal speed limit, and so the speed limit must be determined based on a set of rules in the device. It will be appreciated by a person skilled in the art that a number of different rules can be used to determine a deemed speed limit for the section of road. For example, for speed limits of 130 km/h or higher, the green speed can be determined to always be 120 km/h.

Additionally, or alternatively, the green speed can be determined based on an expected speed of travel for the road currently being traversed. For example, associated with a plurality of segments, and typically each segment, of the digital map is data indicating an expected speed of travel along the respective segment at a plurality of different time periods. This data, which is typically derived from position data collected from a plurality vehicles that have travelled the segment in the past, i.e. historical data, can thus be thought of as time-dependent average speed, and can thus be used to determine a speed at any time of the day that a vehicle is expected to travel along the segment. A speed profile associated with an element, and which represents the variation in expected speed of travel, e.g. average speed, over time for an element, can be determined according to the method described in WO 2009/053411 A1; the entire contents of which is incorporated by reference. In embodiments, the green speed is determined to be the expected speed of travel (e.g. for the current time) minus a predetermined value, such as a value between 5-15 km/h, preferably 10 km/h. In other embodiments, the green speed is determined to be the expected speed of travel multiplied by a scaling factor, which is preferably less than 1, and can be a factor between 0.85-0.95. In other words, the green speed can be percentage of the expected speed of travel for the road currently being traversed.

The green speed can, in embodiments, therefore be based on both the (legal) speed limit an expected speed of travel. For example, it may be required that any determined green speed is within a determined window based around the expected speed of travel. This means that a driver can travel at the advised green speed, thereby helping to reduce fuel consumption, while simultaneously travelling at a speed similar to the vehicles around it, e.g. for the sake of safety. For example, the green speed may be required to be within a predetermined range, e.g. between 2-5 km/h, above and below the expected speed of travel. Thus, when an initial green speed determined using the legal speed limit, e.g. as descried above, is outside of the window, then this initial green speed can be suitably adjusted, e.g. to be the closest value within the window of the expected speed of travel; the adjusted green speed then forming the green speed that is to be displayed to the driver.

In other embodiments, the green speed is determined based on historical fuel consumption data for a vehicle, and preferably an average fuel consumption at a plurality of different speeds (i.e. a fuel consumption per speed histogram); the green speed preferably being the speed (optionally between the current legal speed limit and a percentage thereof, such as 85%) with the lowest average fuel consumption in the histogram.

In embodiments the average fuel consumption is determined when the vehicle is travelling in a particular gear, preferably the highest gear of the vehicle. In other embodiments, the green speed is further determined based on a probability that the vehicle is not using the highest gear at a plurality of different speeds (i.e. a probability of non-highest gear use per speed histogram). The 'not in highest' gear probability is included in the calculation since it is likely the driver unit, i.e. engine, of the vehicle will consume less fuel if the driver uses the highest gear, instead of the other possible gears of the vehicle. Accordingly, in embodiments, two histograms are generated for a vehicle as it performs one or more journeys along a road network: one histogram being the average fuel consumption against speed; and the other being the probability of not using the highest gear against speed.

An exemplary method for determining the average fuel consumption against speed and the probability of not using the highest gear against speed histograms is as follows:

Input:
    speed, v
    current fuel consumption, fc
    current gear, cg
    max gear, mg Contestants:
    minimum speed value, MIN_SPEED, e.g. 51 km/h
    maximum speed value, MAX_SPEED, e.g. 130 km/h
    acceleration threshold, ACCELERATION_THRESHOLD, e.g. 1 km/h Output:
    fuel consumption against speed histogram, fc(v)
    probability of not using the highest gear against speed histogram, no_mg(v) (probability in the histogram is given as a percentage between 0% and 100%)

Algorithm:
For the fc(v) histogram: if v is between MIN_SPEED and MAX_SPEED and the speed change to the last value is lower than ACCELERATION_THRESHOLD, then adjust the average fuel consumption for the current speed with the current fuel consumption.
For the no_mg(v) histogram: if v is between MIN_SPEED and MAX_SPEED, then adjust the average probability for the current speed with the current probability, the current probability being: 0% if cg<mg; or 100% if cg is mg.

In embodiments, the histograms are determined at one of the vehicle tracking device and the navigation device based on data received from the OBD adapter (and which is obtained from the OBD port of the vehicle). As will be appreciated, one histogram could be determined at the vehicle tracking device and the other could be determined at the navigation device. The data received from the OBD adapter can comprise vehicle speed (although this can also be determined from a position determining device within the tracking device or navigation device), current fuel consumption, current gear and maximum gear. An exemplary method for determining fuel consumption from data obtained from a vehicle's OBD port can be found, for example, in WO 2012/137016 A2; the entire disclosure of which is incorporated herein by reference. In alternate embodiments, the current fuel consumption could be obtained from the vehicle CAN bus, thereby providing the actual fuel consumption, rather than an estimated fuel consumption as determined using data from the OBD port.

An exemplary method for determining the green speed using the average fuel consumption against speed and the probability of not using the highest gear against speed histograms is as follows:

Input:
    current legal speed limit, v_limit (e.g. as determined from the digital map or from real-time image processing of a camera feed in the vehicle to identify and read speed limit signs)
    fuel consumption per speed histogram, fc(v)
    probability of not using the highest gear against speed histogram, no_mg(v)

Contestants:
    legal speed limit threshold value, SPEED_LIMIT_MIN_PERCENTAGE, e.g. 85%
    virtual speed limit, VIRTUAL_SPEED_LIMIT, e.g. 130 km/h (used in the algorithm as the value for v_limit when there is no legal speed limit, either in reality or simply because it is unknown to the device performing the algorithm, e.g. due to being missing from the digital map)

Output:
    green speed, gv

Algorithm:
For each speed v' between SPEED_LIMIT_MIN_PERCENTAGE*v_limit and v_limit:
    get average fuel consumption from fc(v) for the speed v' as percentage value as pafc: use the minimum and maximum average fuel consumption over the total data with the fuel consumption histogram as 0% and 100%, and use a linear function between the minimum and maximum to determine pafc for v'
    get the probability from no_mg(v) for the speed v' that the driver doesn't use the highest gear
    store the sum pafc+no_mg(v') as a score for the speed v' in a list speed_score(v')

The green speed gv is set as the speed v' that has the lowest value in the list speed_score(v'), optionally with the gv being rounded to multiplies of 5 respecting the current unit settings.

In other words, if the speed limit changes, the algorithm will start to find a green speed within a certain range below the current speed limit. It uses the information stored in the two histograms: the average fuel consumption against speed histogram and the probability of not using the highest gear against speed histogram. As fuel consumption and the probability don't share a unit, the fuel consumption will be converted first. Therefore the algorithm uses the minimum and the maximum fuel consumption of every speed in the histogram as base values. The minimum value marks the 0% position and the maximum value the 100% position. Now for every speed within the current range we sum up the probability to not use the highest gear and the determined "artificial" fuel consumption probability. Afterwards a minimum search within these values is performed and the velocity of the lowest value used as the green speed.

Accordingly, and as will be seen from the above, in embodiments, the green speed is dependent on the section of road on which the vehicle is travelling, since the green speed should never be greater than the legal speed limit for the section of road. In some sections of the road, the legal speed limit is not always known, and so the speed limit must be determined based on a set of rules in the device. It will be appreciated by a person skilled in the art that a number of different rules can be used to determine a deemed speed limit for the section of road.

Green Speed Display

In embodiments, the determined green speed can be shown to the driver of the vehicle on the display of the navigation device. The green is preferably displayed to the driver, and optionally also only determined, at times when it is possible for the driver to follow the advised green speed. A determination of when to determine and/or display the green speed is preferably based on the (legal) speed limit and/or expected speed of travel for the current road being traversed and the current vehicle speed. An exemplary method for determining when to display the green speed is as follows:

Input:
    current vehicle speed, v_current
    green speed, gv (e.g. may only be determined when the current legal speed limit and/or the expected speed of travel is more than a predetermined threshold, such as when the legal speed limit is 90 km/h or higher)

Contestants:
    MIN_SPEED_TO_SHOW_GREEN_SPEED_PERCENTAGE, e.g. 80%

Algorithm:
If v_current<MIN_SPEED_TO_SHOW_GREEN_SPEED_PERCENTAGE*gv, the determined green speed is not to be displayed to the driver. This can be done, for example, by setting the green speed gv to be undetermined.

Accordingly, in embodiments, a recommended green speed is only displayed to the driver when the current vehicle speed is within a certain predetermined threshold of the determined green speed. For example, in a preferred embodiment, a driver is only shown a green speed when the current speed is more than 80% of the determined green speed. This is to avoid distracting the driver, since there will typically be a good reason that the driver is travelling at a slower than expected speed. Thus, in embodiments, a displayed green speed is removed from the display when the current speed of the vehicle is less than the predetermined threshold, e.g. less than 20% of the determined green speed.

Additionally, or alternatively, a recommended green speed is only displayed to the driver when at least one of the legal speed limit and the expected speed of travel is more than a predetermined value. For example, a green speed can be determined and/or displayed only when the speed limit and/or expected speed of travel is more than 90 km/h. A green speed is also displayed on roads on which there is no legal speed limit, such as the German autobahns (since the speed of travel of such roads is often greater than 90 km/h).

Figure 6:
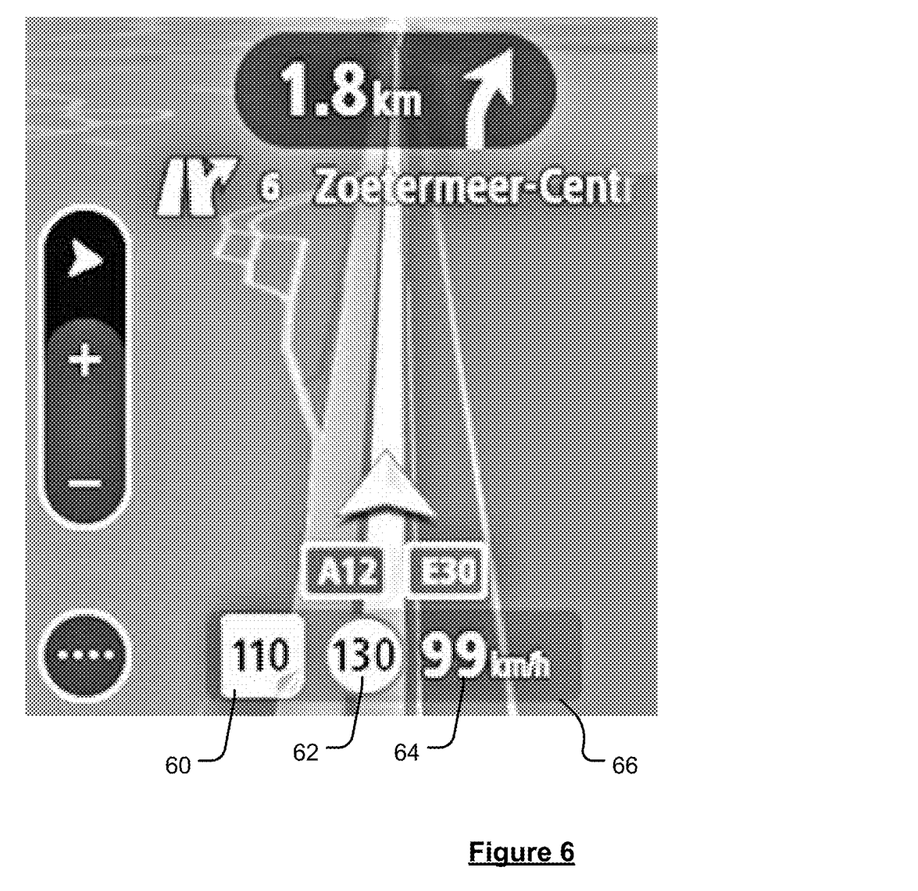
FIG. 6 shows an exemplary display of a navigation device indicating a determined green speed that it is recommended for the driver to follow.

An exemplary manner of showing the determined green speed on the display of the navigation device is shown in FIG. 6. In this example, a green speed 60 is shown, in this case 110 km/h, together with a legal speed limit 62, in this case 130 km/h, and a current vehicle speed 64, in this case 99 km/h. A warning can be given, e.g. by changing the colour of the area 66 around the various speed values, when the current vehicle speed is greater than the greater than the legal speed limit or the green speed. In some embodiments, e.g. when there is no legal speed limit or the legal speed limit is not known, then only the green speed 60 and the current vehicle speed 64 are shown.

In summary, the Applicant has recognised, for example, that the optimal speed for lowest fuel consumption for most passenger cars and light commercial vehicles is between 60 km/h and 80 km/h (although it can differ per vehicle). When driving faster than 80 km/h, the aerodynamic drag will increase and therefore also the fuel consumption. Green speed advice is thus preferably provided for speed limits of 90 km/h and higher. Because it is not safe to drive much slower than the speed limit, the advice is provided 10 km/h below the speed limit up to a speed limit of 130 km/h. For speed limits of 130 km/h (and higher) the green speed advice is always 120 km/h.

Green Speed Performance Indicator

The green speed performance indicator, or score, is based on the recognition that it is desirable for a driver to travel at the determined green speed for as much time as possible, so as to reduce fuel consumption. The green speed performance indicator, as will be appreciated, is indicative of the compliance of a driver of a vehicle to an advised driving speed, i.e. the green speed, during a journey on the road network.

The green speed performance indicator is calculated, e.g. at the server, based on the total driving time at which a green speed was provided to the driver and the amount of time the vehicle speed was less than or equal to the determined green speed (or optionally within a predetermined threshold of the determined green speed).

The score can simply be based on the ratio of the amount of time the driver obeyed the advised driving speed and the total driving time at which the advised driving speed was provided to him or her. The closer the ratio is to 1, i.e. 100% compliance, then a higher score is achieved.

Figure 7:
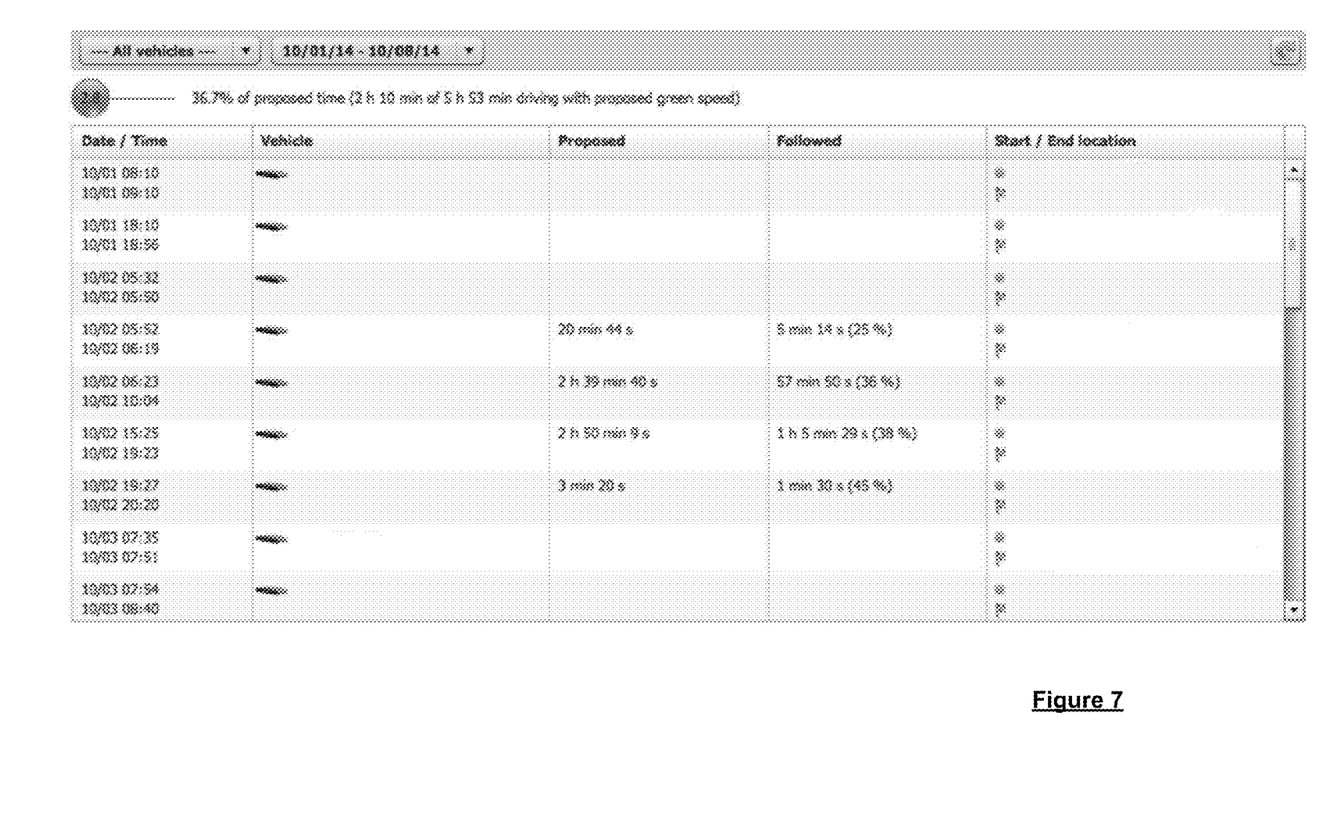
FIG. 7 is an illustration of an exemplary report as viewable on the computer of the fleet manager showing the green speed performance metric for a plurality of trips made by a vehicle or driver.

An exemplary report as viewable on the computer of the fleet manager showing the green speed performance metric for a plurality of trips made by a vehicle or driver is shown in FIG. 7. For example, in one journey on 2 October between 05h52 and 06h19 (total journey time of 27 minutes), the driver was shown an advised driving speed for 20 minutes and 44 seconds, but only complied with this advised green speed for 5 minutes and 14 seconds. Therefore, the driver for this journey obtained a relatively low score of 25%. As will be seen, not all journeys have a green speed score associated with them, since for some journeys the criteria for providing an advised green speed to the driver were never fulfilled.

Any of the methods in accordance with the invention as described above may be implemented at least partially using software, e.g. computer programs. The present invention thus also extends to a computer program comprising computer readable instructions executable to perform, or to cause a computing device, e.g. OBD adapter, vehicle tracking device, navigation device, server, etc, to perform, a method according to any of the above described aspects or embodiments of the invention. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

The invention claimed is:

1. A method of evaluating an advised driving speed of a geared vehicle traversing a particular portion of a road network, comprising:
   accessing first predetermined data indicative of the variation in average fuel consumption for the vehicle with speed of the vehicle, wherein the first predetermined data comprises a fuel consumption per speed histogram having a plurality of bins, each bin associated with an average fuel consumption value that is computed based on fuel consumption values received from the vehicle while traveling at a corresponding speed;
   using the first predetermined data to determine data indicative of average fuel consumption for the vehicle for a plurality of speeds within a range based on a speed limit for the portion of the road network being traversed;
   using second predetermined data indicative of a variation in a likelihood of the vehicle being in a highest gear with a speed of the vehicle to determine data indicative of a likelihood of the vehicle being in the highest gear for the plurality of speeds within the range based on the speed limit for the portion of the road network being traversed;
   evaluating the advised driving speed of the vehicle based at least in part on the determined data indicative of average fuel consumption for the vehicle for the range of speeds and the determined data indicative of a likelihood of the vehicle being in the highest gear for the range of speeds; and
   providing an indication of the determined advised driving speed to a driver of the vehicle, thereby informing the driver of the vehicle of an optimal speed of travel for the vehicle for the portion of the road network being traversed.

2. The method of claim 1, further comprising generating the fuel consumption per speed histogram for the vehicle, said generating comprising:
   receiving a plurality of fuel consumption values of the vehicle;
   receiving a corresponding plurality of speeds of the vehicle, wherein each speed of the vehicle indicates the speed for which a corresponding fuel consumption value was determined;
   assigning each of the fuel consumption values to one of a plurality of bins of a histogram based on the corresponding speed of the vehicle at which the fuel consumption value was determined; and
   evaluating an average fuel consumption value for each bin of the histogram by averaging the fuel consumption values within each bin.

3. The method of claim 1, wherein the second predetermined data indicative of the variation in a likelihood of the vehicle being in the highest gear with speed of the vehicle is a likelihood of the vehicle being in the highest gear per speed histogram.

4. The method of claim 3, further comprising generating the likelihood of the vehicle being in the highest gear per speed histogram for the vehicle, said generating comprising:
   receiving, for each of a plurality of speeds of the vehicle, a value indicative of whether the vehicle was its highest gear at that speed;
   assigning each of the values indicative of whether the vehicle was its highest gear to one of a plurality of bins of a histogram based on the corresponding speed of the vehicle at which the value was determined; and
   evaluating an average value for each bin of the histogram by averaging the values indicative of whether the vehicle was its highest gear within each bin.

5. The method of claim 1, comprising:
   determining a score value for each of the plurality of speeds within the range based on a speed limit for the portion of the road network being traversed, said score value being determined using the first predetermined data and the second predetermined data; and
   setting the advised driving speed of the vehicle as a speed from the plurality of speeds within the range based on the determined score values.

6. The method of claim 1, comprising triggering a determination of the advised driving speed when there is change in a speed limit and/or an expected driving speed for the portion of the road network being traversed.

7. The method of claim 6, wherein the determination of the advised driving speed is triggered when the change in the speed limit and/or expected driving speed is more than a predetermined threshold.

8. The method of claim 1, wherein providing an indication of the advised driving speed to the driver comprises displaying a graphical indication of the advised driving speed on a display device within the vehicle.

9. The method of claim 8, wherein the determined advised driving speed is displayed on the display device in combination with at least one of: the current speed of the vehicle; and the speed limit for the portion of the road network being traversed.

10. The method of claim 1, comprising transmitting the determined advised driving speed to a remote server for use in determining a score indicative of the driver's compliance of the advised driving speed during a journey.

11. An apparatus for evaluating an advised driving speed of a geared vehicle traversing a particular portion of a road network, comprising at least one processor and a memory containing instructions that, when executed by the at least one processor, cause the apparatus to:
    access first predetermined data indicative of the variation in average fuel consumption for the vehicle with speed of the vehicle, wherein the first predetermined data comprises a fuel consumption per speed histogram having a plurality of bins, each bin associated with an average fuel consumption value that is computed based on fuel consumption values received from the vehicle while traveling at a corresponding speed;
    use the first predetermined data to determine data indicative of average fuel consumption for the vehicle for a plurality of speeds within a range based on a speed limit for the portion of the road network being traversed;
    use second predetermined data indicative of a variation in a likelihood of the vehicle being in a highest gear with a speed of the vehicle to determine data indicative of a likelihood of the vehicle being in the highest gear for the plurality of speeds within the range based on the speed limit for the portion of the road network being traversed;
    evaluate the advised driving speed of the vehicle based at least in part on the determined data indicative of average fuel consumption for the vehicle for the range of speeds and the determined data indicative of a likelihood of the vehicle being in the highest gear for the range of speeds; and
    provide an indication of the determined advised driving speed to a driver of the vehicle, thereby informing the driver of the vehicle of an optimal speed of travel for the vehicle for the portion of the road network being traversed.

12. The apparatus of claim 11, wherein the instructions, when executed by the at least one processor, further cause the apparatus to:
    determine a score value for each of the plurality of speeds within the range based on a speed limit for the portion of the road network being traversed, said score value being determined using the first predetermined data and the second predetermined data; and
    set the advised driving speed of the vehicle as a speed from the plurality of speeds within the range based on the determined score values.

13. The apparatus of claim 11, further comprising a display device, and wherein the instructions, when executed by the at least one processor, cause the apparatus to display a graphical indication of the advised driving speed on the display device.

14. The apparatus of claim 11, wherein the apparatus comprises one of: a vehicle tracking device, a portable navigation device, and a navigation device integrated in the vehicle.

15. The apparatus of claim 11, further comprising a wireless transmitter configured to output the determined advised driving speed to a further device.

16. A non-transitory computer readable medium comprising instructions which, when executed by at least one processor of an apparatus comprising the at least one processor, cause the apparatus to perform a method of evaluating an advised driving speed of a geared vehicle traversing a particular portion of a road network, the method comprising:
    accessing first predetermined data indicative of the variation in average fuel consumption for the vehicle with speed of the vehicle, wherein the first predetermined data comprises a fuel consumption per speed histogram having a plurality of bins, each bin associated with an average fuel consumption value that is computed based on fuel consumption values received from the vehicle while traveling at a corresponding speed;
    using the first predetermined data to determine data indicative of average fuel consumption for the vehicle for a plurality of speeds within a range based on a speed limit for the portion of the road network being traversed;
    using second predetermined data indicative of a variation in a likelihood of the vehicle being in a highest gear with a speed of the vehicle to determine data indicative of a likelihood of the vehicle being in the highest gear for the plurality of speeds within the range based on the speed limit for the portion of the road network being traversed;
    evaluating the advised driving speed of the vehicle based at least in part on the determined data indicative of average fuel consumption for the vehicle for the range of speeds and the determined data indicative of a likelihood of the vehicle being in the highest gear for the range of speeds; and
    providing an indication of the determined advised driving speed to a driver of the vehicle, thereby informing the driver of the vehicle of an optimal speed of travel for the vehicle for the portion of the road network being traversed.

* * * * *